US012638360B2

(12) United States Patent
Nakamura et al.

(10) Patent No.: US 12,638,360 B2
(45) Date of Patent: May 26, 2026

(54) OPTICAL FIBER TEST EQUIPMENT AND OPTICAL FIBER TEST METHOD

(71) Applicant: NTT, Inc., Tokyo (JP)

(72) Inventors: Atsushi Nakamura, Musashino (JP); Yusuke Koshikiya, Musashino (JP)

(73) Assignee: NTT, Inc., Tokyo (JP)

( * ) Notice: Subject to any disclaimer, the term of this patent is extended or adjusted under 35 U.S.C. 154(b) by 124 days.

(21) Appl. No.: 18/837,117

(22) PCT Filed: Feb. 21, 2022

(86) PCT No.: PCT/JP2022/006882
§ 371 (c)(1),
(2) Date: Aug. 8, 2024

(87) PCT Pub. No.: WO2023/157283
PCT Pub. Date: Aug. 24, 2023

(65) Prior Publication Data
US 2025/0044187 A1     Feb. 6, 2025

(51) Int. Cl.
G01M 11/02          (2006.01)
G01M 11/00          (2006.01)

(52) U.S. Cl.
CPC ............ G01M 11/02 (2013.01); G01M 11/33 (2013.01)

(58) Field of Classification Search
CPC .............................. G01M 11/02; G01M 11/33
See application file for complete search history.

(56) References Cited

U.S. PATENT DOCUMENTS

| | | | |
|---|---|---|---|
| 2014/0263985 A1* | 9/2014 | Westbrook | G01L 1/242 |
| | | | 385/12 |
| 2018/0038769 A1* | 2/2018 | Hayashi | G01M 11/3109 |
| 2025/0110018 A1* | 4/2025 | Nakamura | G01M 11/3109 |

OTHER PUBLICATIONS

K. Takenaga et al., "An Investigation on Crosstalk in Multi-Core Fibers by Introducing Random Fluctuation along Longitudinal Direction," IEICE Trans.Commun., vol. E94-B, No. 2, pp. 409-416, 2011.

(Continued)

*Primary Examiner* — Jonathan M Hansen

(57)          ABSTRACT

An object of the present invention is to provide an optical fiber testing device and an optical fiber testing method capable of acquiring both unidirectional crosstalk and bidirectional crosstalk of an uncoupled multicore fiber in a short time and with a little man-hour.

The optical fiber testing device 301 according to the present invention includes: the light input unit 10 configured to input test light to an arbitrary core at one end A of the uncoupled multicore fiber 50; the light receiving unit 20 configured to receive output light outputted from each core at the other end B of the uncoupled multicore fiber 50 by the test light and measure light intensity of the output light of each core; and the calculation unit 30 configured to calculate unidirectional transmission crosstalk in a case of performing unidirectional transmission, in which transmission directions of light beams are the same between two cores of the uncoupled multicore fiber 50, from the light intensity of the output light, and calculate bidirectional transmission crosstalk in a case of performing bidirectional transmission, in which transmission directions of light beams are different between two cores of the uncoupled multicore fiber 50, from the unidirectional transmission crosstalk.

4 Claims, 3 Drawing Sheets

(56)  References Cited

OTHER PUBLICATIONS

T. Hayashi et al., "Characterization of crosstalk in ultra-low-crosstalk multi-core fiber", J. Lightw. Technol., vol. 30, No. 4, pp. 583-589, 2012.
T. Ito et al., "Reduction of influence of inter-core cross-talk in MCF with bidirectional assignment between neighboring cores", Proc. OFC 2013, paper OTh3K.2.

\* cited by examiner

OPTICAL FIBER TEST EQUIPMENT AND OPTICAL FIBER TEST METHOD

CROSS-REFERENCE TO RELATED APPLICATIONS

This application is a 371 U.S. National Phase of International Application No. PCT/JP2022/0006882, filed on Feb. 21, 2022. The entire disclosure of the above application is incorporated herein by reference.

TECHNICAL FIELD

The present disclosure relates to an optical fiber testing device and an optical fiber testing method for measuring crosstalk of an uncoupled multicore fiber.

BACKGROUND ART

An uncoupled multicore fiber is one of promising optical fibers as a medium for achieving future large-capacity optical communication. Crosstalk between cores of an uncoupled multicore fiber is an important parameter that limits transmission capacity. Accordingly, a method of evaluating inter-core crosstalk of an uncoupled multicore fiber is required in order to ensure a desired transmission capacity.

Here, crosstalk in a case where signal propagation directions of adjacent cores in an uncoupled multicore fiber are the same (unidirectional crosstalk), and inter-core crosstalk in a case where signal propagation directions are opposite (bidirectional crosstalk) are greatly different from each other, and thus, it is important to grasp the respective characteristics. Non Patent Literatures 1 and 2 disclose methods of measuring unidirectional crosstalk. Non Patent Literature 3 discloses a method of measuring bidirectional crosstalk.

CITATION LIST

Non Patent Literature

Non Patent Literature 1: K. Takenaga et al., "An investigation on crosstalk in multi-core fibers by introducing random fluctuation along longitudinal direction", IEICE Trans. Commun., vol. E94-B, no. 2, pp. 409-416, 2011.
Non Patent Literature 2: T. Hayashi et al., "Characterization of crosstalk in ultra-low-crosstalk multi-core fiber", J. Lightw. Technol., vol. 30, no. 4, pp. 583-589, 2012.
Non Patent Literature 3: T. Ito et al., "Reduction of influence of inter-core cross-talk in MCF with bidirectional assignment between neighboring cores", Proc. OFC 2013, paper OTh3K.2.

SUMMARY OF INVENTION

Technical Problem

Here, the measurement of unidirectional crosstalk (the methods described in Non Patent Literatures 1 and 2) and the measurement of bidirectional crosstalk (the method described in Non Patent Literature 3) are different from each other in a measurement method and a device configuration. That is, it is necessary to perform different measurements in order to grasp both the unidirectional crosstalk and the bidirectional crosstalk of the uncoupled multicore fiber, and there is a problem that it is difficult to shorten a measurement time and reduce a man-hour.

Therefore, in order to solve the above problems, an object of the present invention is to provide an optical fiber testing device and an optical fiber testing method capable of acquiring both unidirectional crosstalk and bidirectional crosstalk of an uncoupled multicore fiber in a short time and with a little man-hour.

Solution to Problem

In order to achieve the above object, an optical fiber testing device according to the present invention is configured to measure only unidirectional crosstalk of the uncoupled multicore fiber and calculate bidirectional crosstalk from the result.

Specifically, an optical fiber testing device according to the present invention includes:

a light input unit configured to input test light to an arbitrary core at one end of an uncoupled multicore fiber;

a light receiving unit configured to receive output light outputted from each core at an other end of the uncoupled multicore fiber by the test light and measure light intensity of the output light of each core; and a calculation unit configured to calculate unidirectional transmission crosstalk in a case of performing unidirectional transmission, in which transmission directions of light beams are same between two cores of the uncoupled multicore fiber, from the light intensity of the output light, and calculate bidirectional transmission crosstalk in a case of performing bidirectional transmission, in which transmission directions of light beams are different between the two cores of the uncoupled multicore fiber, from the unidirectional transmission crosstalk.

Moreover, an optical fiber testing method according to the present invention includes:

inputting test light to an arbitrary core at one end of an uncoupled multicore fiber;

receiving output light outputted from each core at an other end of the uncoupled multicore fiber by the test light and measuring light intensity of the output light of each core;

calculating unidirectional transmission crosstalk in a case of performing unidirectional transmission, in which transmission directions of light beams are same between two cores of the uncoupled multicore fiber, from the light intensity of the output light; and calculating bidirectional transmission crosstalk in a case of performing bidirectional transmission, in which transmission directions of light beams are different between the two cores of the uncoupled multicore fiber, from the unidirectional transmission crosstalk.

Since the measurement of the bidirectional crosstalk can be omitted, both the unidirectional crosstalk and the bidirectional crosstalk of the uncoupled multicore fiber can be acquired in a short time and with a little man-hour. Accordingly, the present invention can provide an optical fiber testing device and an optical fiber testing method capable of acquiring both unidirectional crosstalk and bidirectional crosstalk of an uncoupled multicore fiber in a short time and with a little man-hour.

The bidirectional crosstalk is calculated as follows.

The unidirectional transmission crosstalk is calculated from light intensity of the output light of the one core and light intensity of the output light of the another core, a power coupling coefficient is calculated from the unidirectional transmission crosstalk, and the bidirectional transmission crosstalk is calculated by substituting a Rayleigh scattering coefficient, a backscattering capturing rate, and a loss coefficient into a power coupling equation of Expression C1.

[Expression C1]

$$XT_b \cong \frac{\alpha_s}{\alpha} Bh \left[ \frac{\sinh(\alpha L)}{\alpha} - L \exp(-\alpha L) \right] \tag{C1}$$

Here, $\alpha$ is the loss coefficient, $\alpha_s$ is the Rayleigh scattering coefficient, B is the backscattered light capturing rate, h is the power coupling coefficient, and L is the fiber length of the uncoupled multicore fiber.

Note that the above inventions can be combined in any possible manner.

Advantageous Effects of Invention

The present invention can provide an optical fiber testing device and an optical fiber testing method capable of acquiring both unidirectional crosstalk and bidirectional crosstalk of an uncoupled multicore fiber in a short time and with a little man-hour.

DESCRIPTION OF EMBODIMENTS

Figure 1:
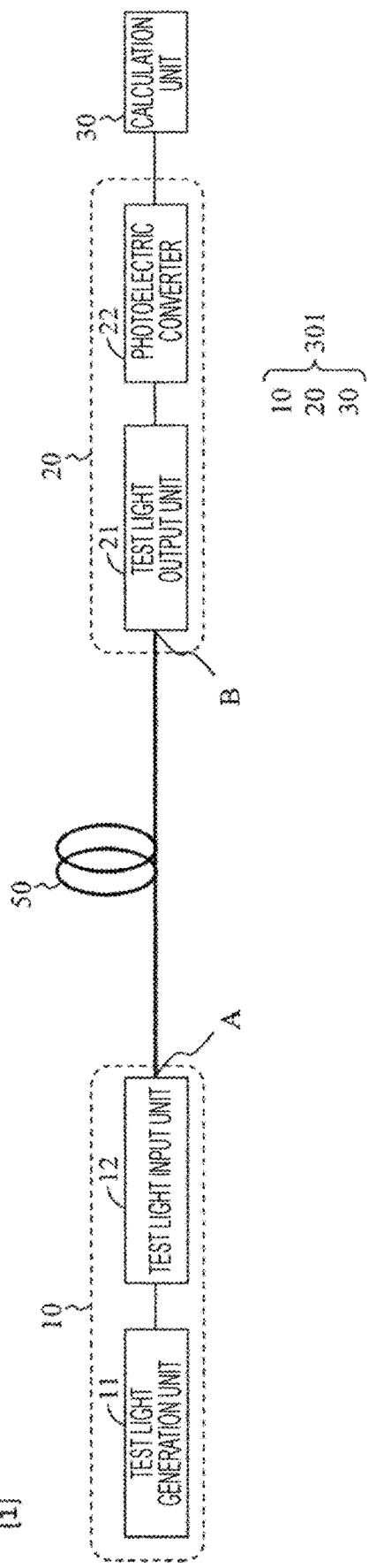
FIG. 1 is a diagram illustrating an optical fiber testing device according to the present invention.

An embodiment of the present invention will be described with reference to the accompanying drawings. The embodiment to be described below is an example of the present invention, and the present invention is not limited to the embodiment to be described below. Note that components having the same reference numerals in the present specification and the drawings indicate the same components.

FIG. 1 is a diagram for explaining an optical fiber testing device 301 according to the present invention. The optical fiber testing device 301 measures both unidirectional crosstalk and bidirectional crosstalk of an uncoupled multicore fiber 50 that is an optical fiber to be tested. The optical fiber testing device 301 includes:

a light input unit 10 configured to input test light to an arbitrary core at one end A of the uncoupled multicore fiber 50;

a light receiving unit 20 configured to receive output light outputted from each core at the other end B of the uncoupled multicore fiber 50 by the test light and measure light intensity of the output light of each core; and a calculation unit 30 configured to calculate unidirectional transmission crosstalk in a case of performing unidirectional transmission, in which transmission directions of light beams are the same between two cores of the uncoupled multicore fiber 50, from the light intensity of the output light, and calculate bidirectional transmission crosstalk in a case of performing bidirectional transmission, in which transmission directions of light beams are different between the two cores of the uncoupled multicore fiber 50, from the unidirectional transmission crosstalk.

The light input unit 10 includes a test light generation unit 11 that generates test light, and a test light input unit 12 that causes the test light to enter an arbitrary core from the one end A of the uncoupled multicore fiber 50. The light receiving unit 20 includes a test light output unit 21 that selectively outputs light, outputted from an arbitrary core at the other end B of the uncoupled multicore fiber 50, to a photoelectric converter 22, and the photoelectric converter 22 that photoelectrically converts the test light outputted from the test light output unit 21. The calculation unit 30 calculates crosstalk from a signal outputted from the photoelectric converter 22.

The test light generation unit 11 is configured with, for example, a broadband light source and a wavelength filter. A single-wavelength light source, a wavelength-tunable light source, or the like may be used.

The test light input unit 12 is, for example, a fan-in/fan-out device. This may be realized by adjusting the optical axis of the core of a single core optical fiber and an arbitrary core of the uncoupled multicore fiber 50.

The test light output unit 21 is, for example, a fan-in/fan-out device. This may be realized by adjusting the optical axis of the core of a single core optical fiber and an arbitrary core of the uncoupled multicore fiber 50.

The photoelectric converter 22 is, for example, a photodetector. Test light outputted from a plurality of cores may be simultaneously photoelectrically converted using a plurality of photodetectors.

Figure 2:
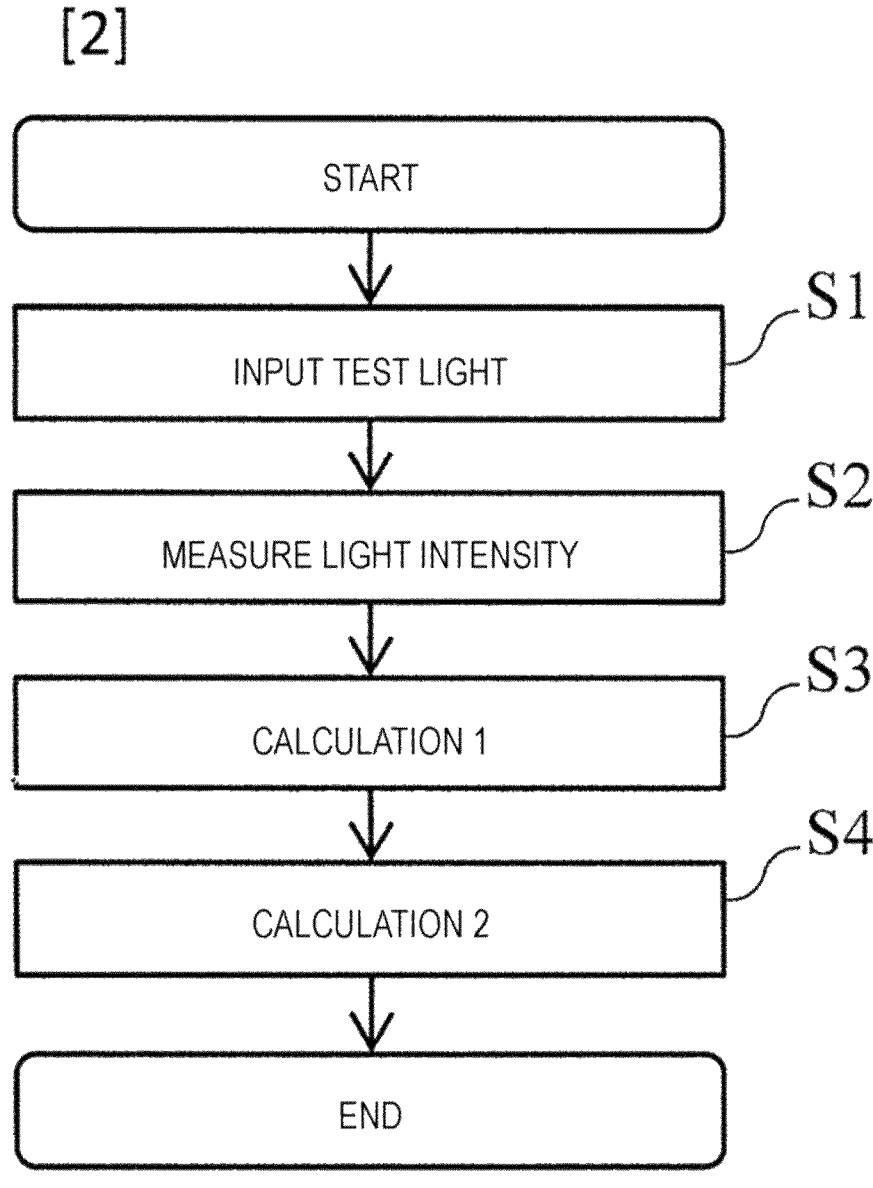
FIG. 2 is a diagram illustrating an optical fiber testing method according to the present invention.

FIG. 2 is a flowchart for explaining an optical fiber testing method performed by the optical fiber testing device 301. The method includes:

inputting test light to an arbitrary core at the one end A of the uncoupled multicore fiber 50 (step S1);

receiving output light outputted from each core at the other end B of the uncoupled multicore fiber 50 by the test light and measuring light intensity of the output light of each core (step S2);

calculating unidirectional transmission crosstalk in a case of performing unidirectional transmission, in which transmission directions of light beams are the same between two cores of the uncoupled multicore fiber 50, from the light intensity of the output light (step S3); and calculating bidirectional transmission crosstalk in a case of performing bidirectional transmission, in which transmission directions of light beams are different between the two cores of the uncoupled multicore fiber 50, from the unidirectional transmission crosstalk (step S4).

The light input unit 10 performs step S1 of generating test light having a desired wavelength and inputting the test light to an arbitrary core at the one end A of the uncoupled multicore fiber 50.

At the other end B of the uncoupled multicore fiber 50, the light receiving unit 20 measures the light intensity of the light outputted from the core to which test light has been inputted and another core. The light intensity of light outputted from a plurality of cores may be sequentially measured or simultaneously measured.

The calculation unit 30 performs step S3 of calculating unidirectional crosstalk from the light intensity of light outputted from each core acquired in step S2, and step S4 of calculating bidirectional crosstalk from the value of the unidirectional crosstalk.

Details of the content of the calculation performed by the calculation unit 30 will be described.

In step S3, unidirectional crosstalk is calculated as follows.

At the other end B of the uncoupled multicore fiber 50, the light intensity of test light outputted from the core i to which the test light has been inputted is denoted by $P_i$, and the light intensity of light outputted from another core j is denoted by $P_j$. Unidirectional crosstalk $XT_f$ [dB] is calculated by the following expression.

[Math. 1]

$$XT_f = 10 \, \log_{10}\left(\frac{P_j}{P_i}\right) \tag{1}$$

Unidirectional crosstalk $XT_f$ is calculated for every two cores selected from cores included in the uncoupled multicore fiber 50.

In step 4, bidirectional crosstalk is calculated as follows.

Process m1: The power coupling coefficient h [m$^{-1}$] is calculated from the unidirectional crosstalk $XT_f$ using the following expression (see Literature 1).

[Math. 2]

$$h = \frac{1}{L}\tanh^{-1}(XT_f) \tag{2}$$

Here, L is the fiber length [m] of the uncoupled multicore fiber 50, which is a known value.

[Literature 1] M. Ohashi et al., "Simple backscattered power technique for measuring crosstalk of multi-core fibers", in Proc. 17th Opto-Electronics and Communications Conference, P1_25, 2012.

Process m2: The Rayleigh scattering coefficient as and the backscattered light capturing rate B of the uncoupled multicore fiber 50 are acquired by the method described in Appendix 1.

Process m3: Bidirectional crosstalk $XT_b$ [dB] is calculated using Expression (C1) derived from a power coupling equation for various parameters obtained in processes m1 and m2. Note that a method for deriving Expression (C1) from the power coupling equation will be described in Appendix 2.

[Expression C1]

$$XT_b \cong \frac{\alpha_s}{\alpha}Bh\left[\frac{\sinh(\alpha L)}{\alpha} - L\exp(-\alpha L)\right] \tag{C1}$$

Here, $\alpha$ is a loss coefficient, $\alpha_s$ is a Rayleigh scattering coefficient, and B is a backscattered light capturing rate.

[Appendix 1] Method for Acquiring Rayleigh Scattering Coefficient and Capturing Rate The loss coefficient $\alpha$ and the mode field diameter w [m] of the uncoupled multicore fiber 50 are items acquired at the time of manufacturing, and are known values. From these values, the capturing rate B and the Rayleigh scattering coefficient $\alpha_s$ are calculated.

The capturing rate B is calculated from the mode field diameter w using the following expression.

[Math. 11]

$$B = \frac{3}{2}\left(\frac{\lambda}{2\pi n w}\right)^2 \tag{11}$$

Here, $\lambda$ is a wavelength [m] of the test light, and n is a core refractive index.

The loss is tested in a wavelength band (e.g., 1310 nm) in which the Rayleigh scattering loss is dominant, and the Rayleigh scattering coefficient $\alpha_s$ in the test wavelength band (the wavelength $\lambda_1$ of the test light) is calculated from the value using Expression (12).

[Math. 12]

$$\alpha_s(\lambda_1) = \left(\frac{\lambda_2}{\lambda_1}\right)^4 \alpha(\lambda_2) \tag{12}$$

Here, $\lambda_1$ is a wavelength [m] of the test light, $\lambda_2$ is a wavelength [m] at which the Rayleigh scattering loss is dominant, and $\alpha(\lambda_2)$ is a loss coefficient (known) at the wavelength $\lambda_2$.

Figure 3:
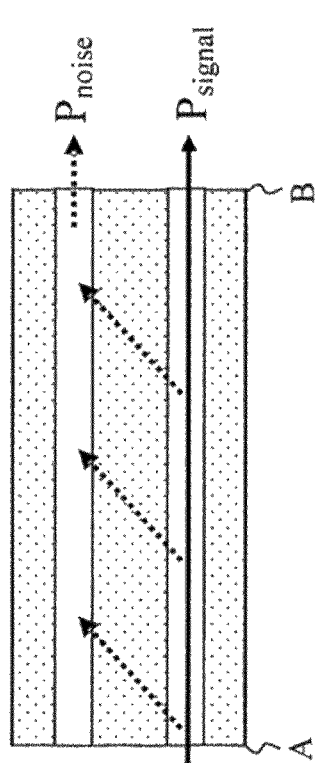
FIG. 3 is a diagram for explaining definition of crosstalk.

[Appendix 2] Technology for Evaluating Crosstalk of Uncoupled Multicore Fiber (1) Definition of Crosstalk Generally, the crosstalk is a ratio of the optical power $P_{signal}$ of a signal intended to be transmitted to the optical power $P_{noise}$ of a signal intended to be blocked. As described above, the crosstalk $XT_f$ in the unidirectional transmission is the ratio ($XT_f=P_{noise}/P_{signal}$) of leakage light outputted from the adjacent core j at the other end B to signal light outputted from the core i at the other end B, both of which branch from signal light entering the core i at the one end A (FIG. 3(A)). On the other hand, when the leakage light from a non-adjacent core is sufficiently small, the crosstalk $XT_b$ in the bidirectional transmission is a ratio ($XT_b=P_{bs}/P_{signal}$) of return light $Pb_{bs}$ outputted from the core i at the one end A, which branches from other signal light entering the adjacent core j at the one end A, to signal light $P_{signal}$ outputted from the core i at the one end A, which derives from signal light entering the core i at the other end B (FIG. 3(B)).

(2) Relationship Between Crosstalk and Fiber Parameter

Here, a relationship between crosstalk in a two-core fiber and a fiber parameter is formulated. It is assumed that fiber losses in the respective cores are equal, and various parameters (fiber loss a, power coupling coefficient h, backscattered light capturing rate B, Rayleigh scattering coefficient $\alpha_s$) are uniform in the longitudinal direction of the optical fiber. The fiber length is denoted by L (m). It is assumed that there is no Fresnel reflection. Note that, under this assumption, even in a multicore fiber having three or more cores, the following relationship is satisfied between adjacent cores.

i) In the Case of Unidirectional Transmission

The light intensity of each core at a position z of a two-core fiber can be described by the following power coupling equation.

[Math. 21]

$$\frac{dP_i(z)}{dz} = -\alpha P_i(z) + h[P_j(z) - P_i(z)] \qquad (21)$$

Here, $P_i$ (z) and $P_j$ (z) respectively denote light intensities in the core i and the core j. Here, it is assumed that i=1 and j=2 are satisfied. Considering a case where continuous light having the light intensity $P_i$ enters only the core #1 from the point of z=0, the solution of Expression (21) is as follows.

[Math. 22]

$$P_i(z) = \frac{P_i}{2}\exp(-\alpha z)[1 + \exp(-2hz)] \qquad (22)$$
$$P_j(z) = \frac{P_i}{2}\exp(-\alpha z)[1 - \exp(-2hz)]$$

Accordingly, the crosstalk over the entire length of the optical fiber can be expressed by the following expression.

[Math. 23]

$$XT = \frac{P_j(L)}{P_i(L)} = \frac{1 - \exp(-2hL)}{1 + \exp(-2hL)} = \tanh(hL) \qquad (23)$$

From Expression (23), it can be seen that the crosstalk XT at the time of unidirectional transmission is determined by the power coupling coefficient h and the fiber length L. Moreover, in a desired range (in a case where hL is small), the crosstalk XT usually increases linearly with respect to the distance L.

ii) In the Case of Opposite Transmission

In a case where continuous light having the light intensity $P_i$ enters from the core #1 at the one end A of the optical fiber, the light intensity $P_{signal}$ outputted from the core #1 at the other end B can be described by the following expression.

[Math. 24]

$$P_{signal} = \frac{P_i}{2}\exp(-\alpha L)[1 + \exp(-2hL)] \qquad (24)$$

On the other hand, in a case where continuous light having the light intensity $P_j$ enters from the core #2 at the other end B of the optical fiber, the light intensity $P_{1bs}$ outputted from the core #1 at the other end B can be expressed by the following expression.

[Math. 25]

$$P_{1bs} = \int_0^L \frac{P_j}{2}\alpha_s B \exp(-2\alpha z)[1 - \exp(-4hz)]dz =$$
$$\frac{P_j \alpha_s B}{4\alpha(\alpha + 2h)}\{2h[1 - \exp(-2\alpha L)] - \alpha\exp(-2\alpha L)[1 - \exp(-4hL)]\} \qquad (25)$$

Here, assuming that $\alpha \gg h$ and $hL \ll 1$ are satisfied, Expression (25) can be approximated as follows.

[Math. 26]

$$P_{1bs} \cong \frac{\alpha_s B}{2\alpha}P_j h\left[\frac{1 - \exp(-2\alpha L)}{\alpha} - 2L\,\exp(-2\alpha L)\right] \qquad (26)$$

Accordingly, assuming that $P_i = P_j$ is satisfied, the crosstalk $XT_b$ at the time of opposite transmission can be expressed by the following expression from Expressions (24) and (26).

[Math. 27]

$$XT_b = \frac{P_{1bs}}{P_{signal}} \cong \frac{\alpha_s}{\alpha} - Bh\left[\frac{\sinh(\alpha L)}{\alpha} - L\,\exp(-\alpha L)\right] \qquad (27)$$

From Expression (27), it can be seen that the crosstalk $XT_b$ at the time of opposite transmission is determined by the fiber loss coefficient $\alpha$, the Rayleigh scattering coefficient $\alpha_s$, and the backscattered light capturing rate B in addition to the power coupling coefficient h and the fiber length L. Moreover, unlike the crosstalk XT at the time of unidirectional transmission, the crosstalk $XT_b$ at the time of opposite transmission increases nonlinearly with respect to the distance L (increases exponentially in a case where $\alpha L$ is large).

Expression (27) is the above-described Expression (C1).

REFERENCE SIGNS LIST

10 Light input unit
11 Test light generation unit
12 Test light input unit
20 Light receiving unit
21 Test light output unit
22 Photoelectric converter
30 Calculation unit
301 Optical fiber testing device

The invention claimed is:

1. An optical fiber testing device comprising:
a light input unit configured to input test light to an arbitrary core at one end of an uncoupled multicore fiber;
a light receiving unit configured to receive output light outputted from each core at an other end of the uncoupled multicore fiber by the test light and measure light intensity of the output light of each core; and
a calculation unit configured to calculate unidirectional transmission crosstalk in a case of performing unidirectional transmission, in which transmission directions of light beams are same between two cores of the uncoupled multicore fiber, from the light intensity of the output light, and calculate bidirectional transmission crosstalk in a case of performing bidirectional transmission, in which transmission directions of light beams are different between the two cores of the uncoupled multicore fiber, from the unidirectional transmission crosstalk.

2. The optical fiber testing device according to claim 1, wherein the calculation unit is further configured to:
calculate the unidirectional transmission crosstalk from light intensity of the output light of the one core and light intensity of the output light of another core;
calculate a power coupling coefficient from the unidirectional transmission crosstalk; and
calculate the bidirectional transmission crosstalk by substituting a Rayleigh scattering coefficient, a backscattered light capturing rate, and a loss coefficient into a power coupling equation of Expression C1:

[Expression C1]

$$XT_b \cong \frac{\alpha_s}{\alpha} Bh \left[ \frac{\sinh(\alpha L)}{\alpha} - L \, \exp(-\alpha L) \right] \tag{C1}$$

where $\alpha$ is the loss coefficient, $\alpha_s$ is the Rayleigh scattering coefficient, B is the backscattered light capturing rate, h is the power coupling coefficient, and L is a fiber length of the uncoupled multicore fiber.

3. An optical fiber testing method comprising:

inputting test light to an arbitrary core at one end of an uncoupled multicore fiber;

receiving output light outputted from each core at an other end of the uncoupled multicore fiber by the test light and measuring light intensity of the output light of each core;

calculating unidirectional transmission crosstalk in a case of performing unidirectional transmission, in which transmission directions of light beams are same between two cores of the uncoupled multicore fiber, from the light intensity of the output light; and calculating bidirectional transmission crosstalk in a case of performing bidirectional transmission, in which transmission directions of light beams are different between the two cores of the uncoupled multicore fiber, from the unidirectional transmission crosstalk.

4. The optical fiber testing method according to claim 3, further comprising:

calculating the unidirectional transmission crosstalk from light intensity of the output light of the one core and light intensity of the output light of another core;

calculating a power coupling coefficient from the unidirectional transmission crosstalk; and calculating the bidirectional transmission crosstalk by substituting a Rayleigh scattering coefficient, a backscattered light capturing rate, and a loss coefficient into a power coupling equation of Expression C1:

[Expression C1]

$$XT_b \cong \frac{\alpha_s}{\alpha} Bh \left[ \frac{\sinh(\alpha L)}{\alpha} - L \, \exp(-\alpha L) \right] \tag{C1}$$

where $\alpha$ is the loss coefficient, $\alpha_s$ is the Rayleigh scattering coefficient, B is the backscattered light capturing rate, h is the power coupling coefficient, and L is a fiber length of the uncoupled multicore fiber.

* * * * *